US011218370B2

(12) United States Patent
Chaignon et al.

(10) Patent No.: US 11,218,370 B2
(45) Date of Patent: Jan. 4, 2022

(54) METHOD FOR APPLYING A PATCH TO A VIRTUALIZED NETWORK FUNCTION TO BE UPDATED

(71) Applicant: ORANGE, Issy-les-Moulineaux (FR)

(72) Inventors: Paul Chaignon, Chatillon (FR); Kahina Lazri, Chatillon (FR)

(73) Assignee: ORANGE, Issy-les-Moulineaux (FR)

( * ) Notice: Subject to any disclaimer, the term of this patent is extended or adjusted under 35 U.S.C. 154(b) by 0 days.

(21) Appl. No.: 16/760,308

(22) PCT Filed: Oct. 24, 2018

(86) PCT No.: PCT/FR2018/052638
§ 371 (c)(1),
(2) Date: Apr. 29, 2020

(87) PCT Pub. No.: WO2019/086783
PCT Pub. Date: May 9, 2019

(65) Prior Publication Data
US 2021/0021462 A1    Jan. 21, 2021

(30) Foreign Application Priority Data

Oct. 31, 2017   (FR) ...................................... 1760280

(51) Int. Cl.
*H04L 12/24*    (2006.01)
*G06F 9/455*    (2018.01)
(Continued)

(52) U.S. Cl.
CPC ........ *H04L 41/082* (2013.01); *G06F 9/45533* (2013.01); *H04L 41/0627* (2013.01);
(Continued)

(58) Field of Classification Search
CPC .............. H04L 41/082; H04L 41/0627; H04L 41/0866; H04L 43/0817; H04L 43/50;
(Continued)

(56) References Cited

U.S. PATENT DOCUMENTS 10,063,453 B1 *   8/2018   Ur ........................... H04L 43/12
10,489,180 B2 *  11/2019   Sharma ............... G06F 9/45558
(Continued)

FOREIGN PATENT DOCUMENTS

EP    3182678 A1    6/2017

OTHER PUBLICATIONS

International Search Report dated Feb. 1, 2019 for corresponding International Application No. PCT/FR2018/052638, filed Oct. 24, 2018.

(Continued)

*Primary Examiner* — Philip C Lee
(74) *Attorney, Agent, or Firm* — David D. Brush; Westman, Champlin & Koehler, P.A.

(57) ABSTRACT

A method including: identifying a set of dependent virtualised network functions included in a first virtual network, the set including at least a virtualised network function to be updated; creating a second virtual network including clones of virtual machines implementing the dependent virtualised network functions of the set; interconnecting, in the second virtual network, clones of the dependent virtualised network functions, identically to an interconnection in the first network of dependent virtualised network functions; identifying an input data packet of the dependent virtualised network functions, duplicating the packet and sending the duplicated packet to the second network; applying a patch to the clone of the virtualised network function to be updated in the second network; triggering an alert when a performance value of a dependent virtualised network function of
(Continued)

the first virtual network differs from a performance value on the clone of the virtualised network function in the second network.

8 Claims, 3 Drawing Sheets

(51) Int. Cl.
*H04L 12/26* (2006.01)
*H04L 12/713* (2013.01)

(52) U.S. Cl.
CPC ...... *H04L 41/0681* (2013.01); *H04L 41/0866* (2013.01); *H04L 43/0817* (2013.01); *H04L 43/50* (2013.01); *H04L 45/586* (2013.01)

(58) Field of Classification Search
CPC H04L 45/586; H04L 41/0681; G06F 9/45533
See application file for complete search history.

(56) References Cited

U.S. PATENT DOCUMENTS

| | | | | |
|---|---|---|---|---|
| 2015/0234725 A1* | 8/2015 | Cillis | .................... | G06F 11/263 |
| | | | | 714/33 |
| 2016/0103698 A1* | 4/2016 | Yang | ..................... | G06F 11/203 |
| | | | | 714/4.11 |
| 2016/0132420 A1* | 5/2016 | Kuo | ..................... | G06F 9/45558 |
| | | | | 717/130 |
| 2018/0316559 A1* | 11/2018 | Thulasi | ............... | H04L 41/5041 |

OTHER PUBLICATIONS

Written Opinion of the International Searching Authority dated Feb. 1, 2019 for corresponding International Application No. PCT/FR2018/052638, filed Oct. 24, 2018.

English translation of Written Opinion of the International Searching Authority dated May 5, 2020 for corresponding International Application No. PCT/FR2018/052638, filed Oct. 24, 2018.

* cited by examiner

METHOD FOR APPLYING A PATCH TO A VIRTUALIZED NETWORK FUNCTION TO BE UPDATED

CROSS-REFERENCE TO RELATED APPLICATIONS

This Application is a Section 371 National Stage Application of International Application No. PCT/FR2018/052638, filed Oct. 24, 2018, the content of which is incorporated herein by reference in its entirety, and published as WO 2019/086783 on May 9, 2019, not in English.

FIELD OF THE DISCLOSURE

The present invention relates to the field of network virtualization, and more particularly to the anticipation of failures when patches are applied to virtualized network functions in the course of execution in a virtual production environment.

BACKGROUND OF THE DISCLOSURE

The past decade has seen a major evolution in telecommunications networks. The main purpose of this evolution, which tends toward a unification of computing and network resources, is to make network resources programmable; it is based on new network paradigms such as SDN (for "Software Defined Networks"), NFV (for "Network Function Virtualization"), and, more generally, network virtualization. Network virtualization allows the execution of multiple virtual network topologies, independent of one another, on the same physical architecture. It operates on three levels:
  hardware resources: network virtualization provides partitioning of the network bandwidth among multiple client users to which virtual networks have been allocated,
  management layer: network virtualization offers sharing of the management plan, enabling different users to control the routing of network packets on a virtual network allocated to them;
  virtual layer: this corresponds to the set of virtual machines that execute virtualized network functions. A virtualized network function, such as an address translation function, may be implemented in this virtual architecture by one or more virtual machines.

When a virtual network topology is instantiated for a user or a user group, or for a particular service, the expression "network slice" (or "tranche de réseau" in French) is used. The users are, for example, virtual infrastructure suppliers, businesses, end users, or the like. Thus a number of network slices, independent of one another, may coexist and be based on the same hardware infrastructure. A user, such as a business, can see only its own network slice, and can access only its own slice. A virtual infrastructure operator that provides virtual networks guarantees the isolation of the virtual networks from one another.

ETSI has defined a reference model known by the name of MANO, which describes the set of entities used for the orchestration of network functions offered by this infrastructure, such as the creation, deployment, migration, etc., of underlying virtual machines. This model introduces components such as virtualized network functions, or "VNF" (for "Virtual Network Function"), which provide a specific network function and are implemented by one or more virtual machines containing a software suite and options required for the execution of these functions. The MANO model also defines the "VIM" (for "Virtual Infrastructure Management"), which corresponds to the management layer of the hardware infrastructure, of the virtualization layer and of the virtual layer.

Thus network virtualization allows a high degree of flexibility in network offers. A user such as a business or a government department or the like uses its network as if it were using a conventional physical network. Network virtualization may be used to virtualize all the servers, routers, switches and firewalls of network topologies so that they are all executed on a single hardware platform, without additional investment in the network hardware.

In such a virtual network architecture, as in a conventional network architecture, updates may be required. In this case the common practice is to apply patches to virtualized network functions, in the same fashion as they would be applied to network equipments implementing these functions in a conventional network architecture.

The application of patches is based, in a conventional way, on test procedures. For the implementation of these procedures, it is common practice to define a set of tests that is as exhaustive as possible, to apply this set of tests to the patched function, in other words to the function to be updated which incorporates the patch, and then, when the tests have been passed successfully, to patch, or apply the patch to, the function to be updated which is executed in its production environment. The tests are usually conducted in a test environment, isolated from the production environment and considered to reproduce the production environment of the function to be updated.

However, the test procedures cannot anticipate all the possible failures of a virtualized network function updated in a virtual network. There are at least three categories of failure that cannot be anticipated:
  incompleteness of the set of tests. This evidently goes beyond a context of network virtualization;
  former state of the virtualized network function to be updated; a patch is applied to at least one virtual machine of the virtualized network function which already has a system state. This state comprises CPU register values, the content of memory pages, network connections, etc. When patches are applied during the test phase on a virtual machine created for the requirements of a test, the machine has a former state different from that of the virtual machine in the course of execution in a production environment. Because of these different states, the patch may produce different and unexpected results, depending on the virtualized network function to which it is applied;
  unpredictability of the incoming traffic of the virtualized network function to be updated: the preceding virtualized network functions, that is to say those that are passed through by traffic that is subsequently routed to the virtualized network function to be updated, may introduce anomalies which are difficult to allow for in the tests.

SUMMARY

An exemplary embodiment of the invention proposes a method for applying a patch to a virtualized network function to be updated that is included in a first virtual network, a network hypervisor being interfaced between the first virtual network and a set of at least one hardware resource capable of supplying necessary resources to said first virtual network, said method, implemented by the network hypervisor, comprising:

identifying a set of dependent virtualized network functions included in the first virtual network, said set comprising at least the virtualized network function to be updated, creating a second virtual network called a "virtual test network", said virtual test network comprising clones of virtual machines implementing the dependent virtualized network functions of the set, said cloned virtual machines forming clones of the dependent virtualized network functions of the set, interconnecting, in the virtual test network, clones of the dependent virtualized network functions of the set, said interconnection being identical to an interconnection in the first network of the dependent virtualized network functions of the set, identifying at least one input data packet of a virtualized network function of the set of dependent virtualized network functions, duplicating said packet and routing said duplicated packet to the virtual test network, applying a patch to the clone of the virtualized network function to be updated in the test network, collecting and comparing values of at least a first and a second performance indicator, a first indicator measuring a performance value on a monitored virtualized network function of the set of dependent virtualized network functions of the first virtual network and a second indicator measuring the performance value on the clone of the monitored virtualized network function in the virtual test network, an alert being triggered when the values of the first and second indicators differ.

The method described here may be used to anticipate failures when patches are applied to virtualized network functions to be updated and in the course of execution in a production environment. The creation of the virtual test network takes place without any stoppage or disturbance of the virtual production network. This is because the virtual machine or machines that implement the virtualized network function or functions which are to form part of the virtual test network are duplicated, or cloned "hot", that is to say without interrupting their execution. This cloning makes it possible to obtain virtualized network functions and underlying virtual machines that have a state system identical to that of the virtualized network functions and underlying virtual machines that are executed in the virtual production network. Therefore the test conditions created in this way in the virtual test network are similar to those of the production network, and are therefore ideal for testing the virtualized network function to be updated.

Furthermore, the test conditions are such that they correspond to the operating environment associated with the virtual production network. This is because input packets of the dependent virtualized network functions are copied and routed to the virtual test network. Thus there is no need to provide a specific test set, because the virtual test network operates to some degree in parallel with the virtual production network, and receives the same packets as those received by the dependent virtualized network functions in the production environment.

By establishing a virtual test network closely correlated with the production network, because every input packet intended for a virtualized network function of the set of dependent functions is duplicated and routed to the corresponding virtualized network functions in the virtual test network, it is possible to allow for anomalies in the input packets that may be attributable to preceding virtualized network functions, that is to say virtualized network functions that are passed through by the packets that are then routed to the virtualized network functions to be updated, or more generally to a dependent virtualized network function. Thus the test of the patch is conducted optimally, without any risk of incompleteness of the test set at the level concerned, that is to say at the level of the content of the input packets.

In an exemplary embodiment, the set of dependent virtualized network functions also comprises at least another virtualized network function which is functionally dependent on the virtualized network function to be updated.

The set of dependent virtualized network functions which are identified are those that may be disturbed when the patch is applied to the virtualized network function to be updated. This is because they are all functionally dependent on the virtualized network function to be updated. Therefore they may all be affected by the patch. In an exemplary embodiment, these dependent functions are identified by a manager of the production network, on the basis of the manager's knowledge of its production network.

In a first exemplary embodiment, when a virtual infrastructure manager makes an interface of the network hypervisor available to a client to which the first virtual network has been allocated, so that the client controls the first virtual network, said client thus exercising what is called indirect control of the first virtual network, the identification of an input packet of a virtualized network function of the set of dependent virtualized network functions, the duplication of the packet and the routing of said duplicated packet to the test network comprise, when the virtualized network function of the set of dependent virtualized network functions and the clone of the corresponding virtualized network function included in the second network are hosted by the same host server:

installing a configuration rule on a network routing equipment of the host server, said network routing equipment being adapted to transmit the packet to the virtualized network function of the set of dependent virtualized network functions, said configuration rule comprising duplication of the input packet of the virtualized network function of the set of dependent virtualized network functions, and transmission of said duplicated packet to the clone of the corresponding virtualized network function contained in the second network and hosted by the host server.

In a second exemplary embodiment, when a virtual infrastructure manager makes an interface of the network hypervisor available to a client to which the first virtual network has been allocated, so that the client controls the first virtual network, said client thus exercising what is called indirect control of the first virtual network, the identification of an input packet of a virtualized network function of the set of dependent virtualized network functions, the duplication of the packet and the routing of said duplicated packet to the corresponding virtualized network function in the test network comprise, when the virtualized network function of the set of dependent virtualized network functions is hosted by a first host server (h1) and the clone of the corresponding virtualized network function contained in the second network is hosted by a second host server:

installing a first configuration rule on a first network routing equipment of the first host server, said first network routing equipment being adapted to transmit the packet to the virtualized network function of the set of dependent virtualized network functions, said configuration rule comprising duplication of the input packet of the virtualized network function of the set of dependent virtualized network functions, and transmission of said duplicated packet to the second server, a second configuration rule being installed on a second network routing equipment included in the second host server, the second configuration rule comprising the transmission of said packet to the clone of the corresponding virtualized network function included in the second network and hosted by the second host server.

In another exemplary embodiment, the network hypervisor receives from an operator of the first virtual network a rule to be installed in a network routing equipment, said rule modifying an identifier of the first virtual network, included in a packet to be routed to the virtual test network, into an identifier of the virtual test network, said rule being installed on the equipment by the hypervisor when the virtual test network is dedicated to the tests of virtualized network functions and when the first virtual network and the virtual test network belong to the same client.

According to an exemplary embodiment of the method, a connection-oriented communication protocol being used to communicate with a dependent virtualized network function of the set, the step of identifying, duplicating and routing a packet to the test network comprises, in a connection establishment phase:
  receiving a synchronization packet, said packet having been received by the dependent virtualized network function and duplicated and being intended for routing to the corresponding virtualized network function in the test network, said packet comprising a connection identifier, and routing said synchronization packet to the corresponding virtualized network function in the test network,
  receiving from the corresponding virtualized network function a first acknowledgement packet comprising a first sequence number, and associating the first sequence number included in said acknowledgement packet with the connection identifier, and routing said first acknowledgement packet,
  receiving a second acknowledgement packet, said second acknowledgement packet having been received previously by the dependent virtualized network function and duplicated and being intended for routing to the corresponding virtualized network function in the test network, said packet comprising the connection identifier and a first acknowledgement number calculated by incrementing a second sequence number generated and transmitted previously by the dependent virtualized network function, and replacing, in the second acknowledgement packet, said first acknowledgement number with a second acknowledgement number calculated by incrementing the first sequence number, and routing said second acknowledgement packet to the corresponding virtualized network function in the test network.

In this exemplary embodiment, a virtualized network connection management function may be used, in the case of connection-oriented communication protocols, to manage the connections belonging to the protocol used, in a way that is transparent for the client. This management is required because of the routing of the input packets of the set of virtualized network functions to the corresponding virtualized network functions of the test environment. The connection management is centralized in a virtualized network connection management function which is capable of identifying whether such management is necessary, that is to say identifying whether the type of protocol used requires specific connection management, and is capable of managing the set of connections so that the method for applying the patch is used without any other modification.

The invention also relates to a server comprising a network hypervisor interfaced between a first virtual network and a set of at least one hardware resource capable of providing necessary resources for said first virtual network, said hypervisor being adapted to apply a patch to a virtualized network function to be updated included in the first virtual network, said server comprising:
  first identification means, arranged for identifying a set of dependent virtualized network functions included in the first virtual network, said set comprising at least the virtualized network function to be updated,
  creation means, arranged for creating a second virtual network called a "virtual test network", said virtual test network comprising clones of virtual machines implementing the dependent virtualized network functions of the set, said cloned virtual machines forming clones of the dependent virtualized network functions of the set,
  interconnection means, arranged for interconnecting, in the virtual test network, clones of the dependent virtualized network functions of the set, the interconnection of the clones of the dependent virtualized network functions of the set being identical to an interconnection in the first network of the dependent virtualized network functions of the set,
  identification, duplication and routing means, arranged for identifying at least one input data packet of a virtualized network function of the set of dependent virtualized network functions, duplicating said packet, and routing said duplicated packet to the virtual test network,
  application means, arranged for applying a patch to the clone of the faulty virtualized network function in the test network,
  collection and comparison means, arranged for collecting and comparing values of at least a first and a second performance indicator, a first indicator measuring a performance value on a monitored virtualized network function of the set of dependent virtualized network functions of the first virtual network and a second indicator measuring the performance value on the clone of the monitored virtualized network function in the virtual test network, an alert being triggered when the values of the first and second indicators differ.

The invention also relates to a computer program on a data medium which can be loaded into the memory of a computer server, the program comprising program code instructions for controlling the execution of the steps of the method for applying a patch to a virtualized network function to be updated in a virtual network as described above, when the program is executed on said server.

BRIEF DESCRIPTION OF THE DRAWINGS

Other characteristics and advantages of the present invention will be more clearly understood from the description and the attached drawings, in which.

DETAILED DESCRIPTION OF ILLUSTRATIVE EMBODIMENTS

Figure 1:
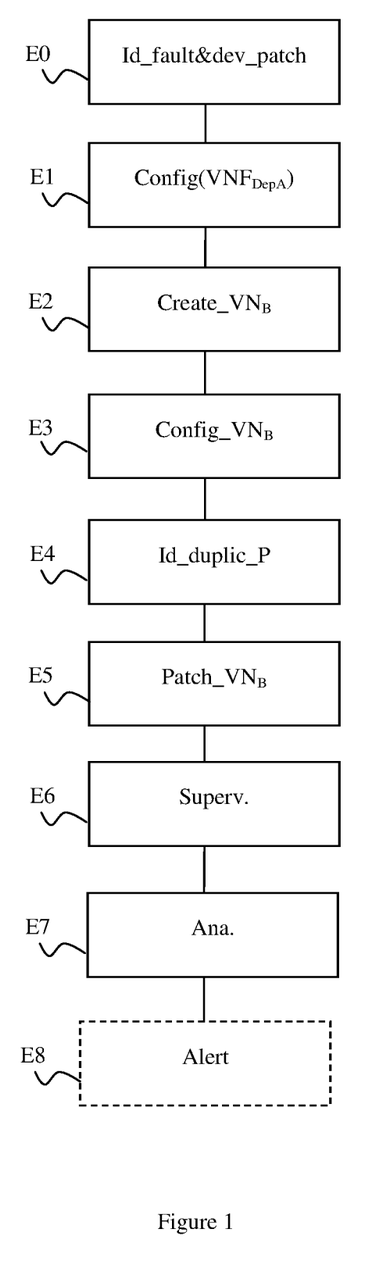
FIG. 1 shows the steps of a method for applying a patch to a virtual network function to be updated, according to an exemplary embodiment.

The steps of a method for applying a patch to a virtualized network function to be updated, according to an exemplary embodiment, will now be described with reference to FIG. 1.

It is assumed that, in an initial phase of providing a virtual network, a virtual infrastructure manager has provided to a client, on the application of the latter, a virtual network, called a virtual production network, denoted $VN_A$. The virtual infrastructure is established in a context of network virtualization and is adapted to offer different clients virtual network topologies that are independent of one another, or "network slices" ("tranches de réseau" in French), and that are executed on top of the same hardware infrastructure. The virtual network $VN_A$ is arranged for hosting one or more services according to the client's needs. A service executed in the virtual production network $VN_A$ comprises a logical set of virtualized network functions, or "VNF" (from the English "Virtual Network Function"). Each virtualized network function is adapted to execute a specific process, for example a packet routing process, a firewall process, an address translation process, etc. These virtualized network functions communicate by packet exchange to provide the expected service. Each virtualized network function is implemented by one or more virtual machines, or "VM" (from the English "Virtual Machine"). As specified before, the client's virtual production network $VN_A$ is based on a set of hardware resources distributed over one or more host equipments, such as computer servers and possibly dedicated network equipments such as routers, switches or the like. It should be noted that the functions of dedicated network equipments may also be provided by software modules, in which case the hardware infrastructure is exclusively composed of computer servers. The client accesses its virtual network $VN_A$ via a software module called a virtual network operator. A network hypervisor, controlled by the manager of the infrastructure, is interfaced between the hardware resources of the infrastructure and the operator of the virtual network controlled by the client, and between the operator of the virtual network and the client's virtual production network $VN_A$. The network hypervisor allocates to the client's virtual network $VN_A$ the hardware resources that it needs, in a manner that is transparent for the client. The client, via the virtual network operator, can only see its virtual network $VN_A$; it has no access to the underlying hardware resources. Depending on the network hypervisor, the client may control its virtual network via the network operator by various methods.

According to a first exemplary embodiment of the control of a virtual network by a client, the network hypervisor, which is interfaced between the virtual network operator and the client's virtual network $VN_A$, provides the client with an interface, or "API" (pour "Application Programming Interface"), adapted to receive requests from the client and to apply them to the virtualized network functions of the client's virtual network $VN_A$. This API offers the client a view of the set of virtualized network functions and the virtual machines of its virtual network $VN_A$. The network hypervisor translates the client's requests into configuration for the underlying hardware infrastructure. When the network hypervisor provides the client with such an interface for accessing its virtual network, the client is said to be exercising indirect control over its network. The physical topology is completely concealed from the client, and the client sees nothing of its virtual network other than the virtualized network functions and the virtual machines. This approach offers a high degree of flexibility to the network hypervisor in the manner in which it provides the isolation between the virtual networks. The way in which packets are routed between virtual machines and/or virtualized network functions of the network to conform to the configuration defined by the client is controlled by the network hypervisor, and not determined by the client. Typically, the network hypervisor may install tunnels to encapsulate data between the virtual machines of the same virtual network, instead of defining virtual local networks ("VLAN", for "Virtual Local Area Network" in English). It is assumed henceforth that the client exercises indirect control over its virtual network $VN_A$.

In an initial step E0 of identifying a virtualized network function to be updated and developing a patch, the client identifies, in his virtual production network $VN_A$, a virtualized network function to be updated. This virtualized network function is denoted $VNF_A$. For example, a degradation of performance or localized malfunctions have been observed in the virtualized network function $VNF_A$. It is assumed that the client has a suitable monitoring tool for detecting such a fault. In another exemplary embodiment, a security breach has been published; this breach concerns the virtualized network function, but the breach has not been exploited and has not affected the virtual production network $VN_A$. In another exemplary embodiment, it has been decided that a virtualized network function requires a minor update. It is also assumed that the client has analyzed the requirements of this update, and has developed, or arranged for the development of, a patch in the form of a software module considered to be capable of updating the virtualized network function. The client wishes to test the application of this patch in a test environment before applying it to the virtualized network function $VNF_A$ in its production environment, that is to say in the virtual network $VN_A$. Whatever the circumstances may be, in this case the client wishes to update a virtualized network function without the need to reboot the system of the underlying host server or servers. The update is therefore intended to be implemented in the virtual production network $VN_A$, without interrupting the operation of this network.

In a step E1 of providing a configuration for the test, the client sends to the manager of the virtual infrastructure a list of dependent virtualized network functions, comprising the virtualized network function to be updated $VNF_A$, together with a set of virtualized network functions of the virtual network $VN_A$ identified as being functionally dependent on the virtualized network function $VNF_A$ to be updated. This set of dependent virtualized network functions which comprises the virtualized network function to be updated $VNF_A$ and, if appropriate, the virtualized network functions functionally dependent on the virtualized network function to be updated $VNF_A$, comprises the set of virtualized network functions participating in the processing of a packet sent from the virtualized network function $VNF_A$ to be updated; this set is denoted $VNF_{DepA}$, and is supplied by the client to the network hypervisor in the form of a list of identifiers of the functions in their production environment $VN_A$.

In a first exemplary embodiment, a network administrator of the client's virtual production network $VN_A$ has a sufficient knowledge of the architecture of the virtual network $VN_A$ to supply the list of the identifiers of the dependent virtualized network functions $VNF_{DepA}$ which comprises the virtualized network function to be updated $VNF_A$ and, if appropriate, the virtualized network functions that are functionally dependent on it.

In a next step E2 of creating a virtual test network, the network hypervisor creates a second virtual network, or network slice $VN_B$, called a "virtual test network", belonging to the client, on the basis of the configuration supplied previously. This virtual test network $VN_B$ is intended to test the patch to be applied to the virtualized network function to be updated $VNF_A$ in a test environment similar to a part of the production environment formed by the virtual network $VN_A$, in this case to the sub-network comprising the set $VNF_{DepA}$ of the dependent virtualized network functions. For this purpose, the network hypervisor, or more precisely the virtual infrastructure manager, commands the cloning, or duplication, of the set of virtual machines that implement the virtualized network functions of the list of dependent virtualized network functions $VNF_{DepA}$ supplied in the preceding step E1. It should be noted that, in existing virtualization infrastructures such as OpenStack, there are existing programs for creating and managing a virtual environment, and notably for cloning virtual machines; they do not require the stoppage of the virtual machines, this operation being called "hot cloning" in English. Thus, the operation of the client's virtual production network $VN_A$ is not disturbed during the cloning of the virtual machines. When a virtual machine is cloned, or duplicated, the resulting virtual machine, or clone of the virtual machine, has the same characteristics as the virtual machine: it has the same network address and the same MAC address, has the same amount of resources, etc. However, it is installed on different memory pages. The cloned virtual machines are therefore distinct from the virtual machines, while providing identical functions. The duplicated virtual machines are attached to the virtual test network $VN_B$. At this stage, the virtual test network $VN_B$ therefore comprises the set of dependent virtualized network functions $VNF_{DepA}$ that were listed in step E1. More precisely, the test network $VN_B$ comprises the set of the clones of the virtual machines that implement the virtualized network functions of the list $VNF_{DepA}$. In the execution environment formed by the test network $VN_B$, the list of the virtualized network functions that are implemented by the set of cloned virtual machines is denoted $VNF_{DepB}$. Hereafter, the clones of the virtualized network functions $VNF_{DepB}$ are also referred to as the corresponding virtualized network functions of the dependent virtualized network functions $VNF_{DepA}$ in the test network $VN_B$.

In a virtual test network configuration step E3, the network hypervisor configures the network equipments of the underlying hardware infrastructure so as to interconnect the set $VNF_{DepB}$ of the clones of the virtualized network functions included in the virtual test network $VN_B$. The clones of the dependent virtualized network functions of the list $VNF_{DepB}$ are interconnected in the test network $VN_B$ in the same way as the dependent virtualized network functions of the list $VNF_{DepA}$ of the production network $VN_A$. It should be noted that this step does not require the bypassing of the network isolation, since the virtual networks $VN_A$ and $VN_B$ are completely separate at this stage.

In the next step E4 of identifying, duplicating and routing packets, the network hypervisor identifies input data packets of the set formed by the dependent virtualized network functions $VNF_{DepA}$ of the virtual network $VN_A$, and duplicates these packets in order to route them additionally into the set formed by the corresponding virtualized network functions $VNF_{DepB}$ of the virtual test network $VN_B$. It should be noted that the identified packets have been sent in the production network $VN_A$ by a virtualized network function outside the set $VNF_{DepA}$. In order to duplicate the input packets of the set of dependent virtualized network functions $VNF_{DepA}$ and route the duplicated packets to the set of corresponding virtualized network functions $VNF_{DepB}$ in the test network $VN_B$, the network hypervisor must be modified. In fact, such processing bypasses the isolation between the networks, since a packet initially routed in the virtual network $VN_A$ is also routed in another virtual network, in this case the virtual test network $VN_B$.

In the exemplary embodiment described here, corresponding to the client's indirect control over its virtual production network $VN_A$, for which the network hypervisor provides the client with an access interface API so that the client can control its virtual network, the network hypervisor modifies the API that it provides to the client so that the packets intended for the set of dependent virtualized network functions $VNF_{DepA}$ in the virtual production network $VN_A$ are also routed to the set of clones of the virtualized network functions $VNF_{DepB}$ of the test network $VN_B$. Although this modification runs counter to network isolation, it is under the control of the network hypervisor, and is intended to establish a test environment in parallel to the production environment in which the faulty virtualized network function $VNF_A$ operates, while not disturbing the operation of this function. This modification is manifested by the definition of a new configuration action, accessible by the client via the API, intended to cause a packet received by a virtualized network function on the list $VNF_{DepA}$ to be duplicated and also routed to the clone of this virtualized network function, or a corresponding virtualized network function on the list $VNF_{DepB}$ of the test network $VN_B$. This action, parameterized at the API level by the client, is manifested, for the network hypervisor, in an action of configuring the underlying hardware resources. For this purpose, the network hypervisor configures a network routing equipment, located upstream of a virtualized network function of the set $VNF_{DepA}$, denoted $VNF_x$, of the virtual production network $VN_A$, that receives an input packet from a virtualized network function outside the set. More precisely, this routing equipment is the one that routes packets to the virtualized network function $VNF_x$ in the production network $VN_A$. The equipment is, for example, a network switch (as it is called in English), arranged for connecting a number of segments in a network and allowing the creation of virtual circuits, or a network router where networks are interconnected. The routing equipment may be a dedicated network equipment or a software equipment hosted by a host server that implements functions of the equipment. It should be noted that the virtualized network function $VNF_x$ may receive packets from different sources, which may be manifested by routing implemented by a number of routing equipments. Parameterization then consists in parameterizing these multiple routing equipments so that the virtualized network function corresponding to $VNF_x$ in the test network $VN_B$ receives the set of packets intended for the virtualized network function $VNF_x$ of the production network $VN_A$. The parameterization consists in duplicating all the packets intended for the virtualized network function $VNF_x$ and routing the duplicated packets to the corresponding virtualized network function of the test network $VN_B$. For this purpose, the network routing equipment is parameterized so as to allow the packet to be duplicated and sent to the virtual test network $VN_B$. When the configuration has been applied to the underlying network routing equipment, every packet intended for the virtualized network function $VNF_x$ in the virtual production network $VN_A$ is duplicated to form a duplicated packet which is routed to the corresponding virtualized network function in the virtual test network $VN_B$; this corresponding virtualized network function is denoted $VNF_{x'}$.

Figure 2A:
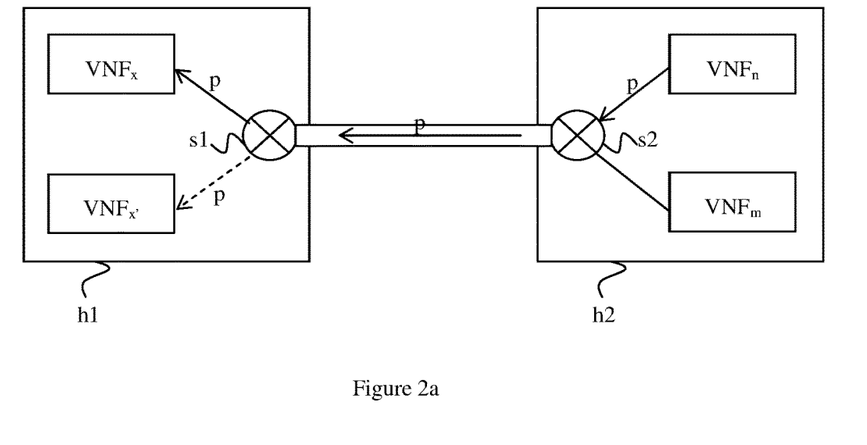
FIGS. 2a and 2b show a first and a second example of underlying hardware architecture and configuration of this architecture by a network hypervisor for the implementation of certain steps of the method for applying a patch, in the case of indirect monitoring of the virtual networks.

It should be noted that different underlying hardware configurations may be present. Thus, in a first example of an underlying hardware configuration, illustrated in FIG. 2a, the virtualized network function $VNF_x$ of the production network $VN_A$ and the corresponding virtualized network function in the virtual test network $VN_B$, $VNF_{x'}$, are hosted on the same host server h1. More precisely, the virtual machines that implement the virtualized network functions $VNF_x$ and $VNF_{x'}$ are hosted by the same server h1. In this case, in order to duplicate the packets addressed to $VNF_x$ and copy them to $VNF_{x'}$, the network hypervisor installs a rule on a network routing equipment s1 of the switch type located immediately upstream of the virtualized network function $VNF_x$ in the production network $VN_A$, so that every packet intended for $VNF_x$ is duplicated and routed to $VNF_{x'}$.

Figure 2B:
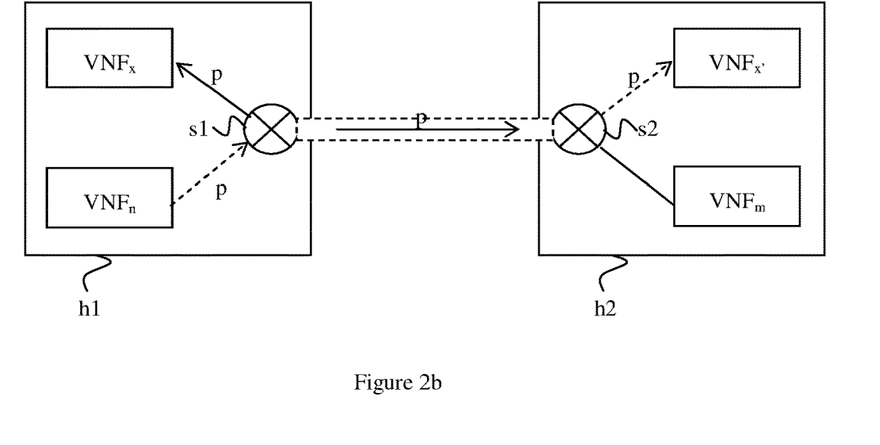
Figure 3:
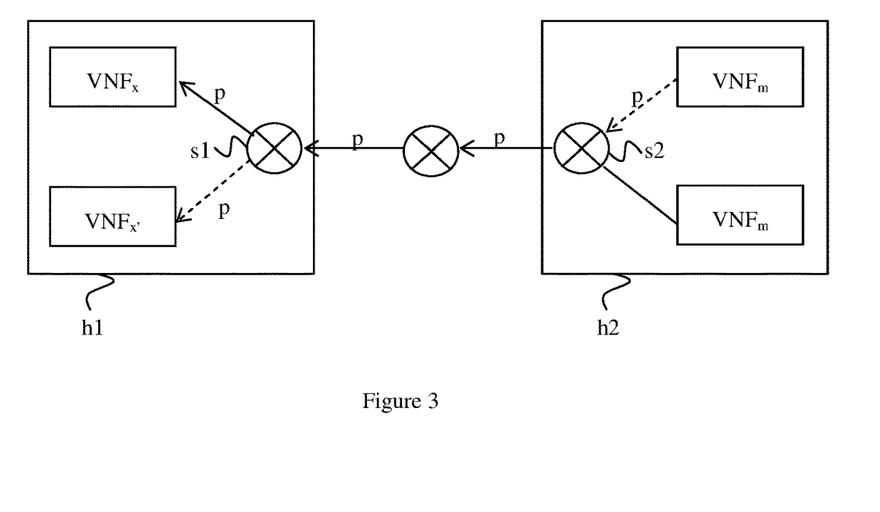
FIG. 3 shows an example of underlying hardware architecture and configuration of this architecture by a network hypervisor for the implementation of certain steps of the method for applying a patch, in the case of direct monitoring of the virtual networks.

In a second example of configuration, illustrated in FIG. 2b, the virtualized network function $VNF_x$ of the production network $VN_A$ is hosted by a first host server h1, and the corresponding virtualized network function $VNF_{x'}$ in the test network $VN_B$ is hosted by a second host server h2. In this case, a tunnel (in broken lines in FIG. 2b) is established between the two host servers h1, h2, and the switch s1 that is located immediately upstream of the virtualized network function $VNF_x$ and that routes packets to this virtualized network function is configured so that a packet addressed to the function $VNF_x$ is duplicated and routed to the corresponding virtualized network function $VNF_{x'}$ via the tunnel configured for this purpose. It may be necessary to configure a switch s2 of the second host server h2 when a plurality of virtualized network functions are hosted by the second host server h2.

In a step E5 of applying the patch, the client of the virtual production network $VN_A$ that controls the virtual network $VN_A$ and the virtual test network $VN_B$ causes the patch, obtained in step E0 of identifying a virtualized network function to be updated and developing a patch, to be applied to the clone of the virtualized network function to be updated $VNF_A$, denoted $VNF_{A'}$, in the test network $VN_B$. It should be noted that tools may be used for applying such a patch without the need to restart the underlying virtual machine(s) of the virtualized network function $VNF_{A'}$, or of the test network $VN_B$ more generally. By way of example, we may mention Ksplice, an open source solution for Linux.

In a subsequent monitoring step E6, the client monitors the operation of the virtualized network functions $VNF_{DepA}$ of the virtual production network $VN_A$ and the corresponding virtualized network functions $VNF_{DepB}$ of the virtual test network $VN_B$. System and network performance indicators are thus collected from the set of virtualized network functions $VNF_{DepA}$ and the corresponding virtualized network functions $VNF_{DepB}$. It should be noted that the same indicators are collected from the virtual production network $VN_A$ and the virtual test network $VN_B$. The network indicators comprise, for example, the number of packets or octets sent for a given connection or during a given time interval, the duration of the connections, and the number of packets lost, if applicable. Such network indicators are collected periodically and are accessible in a centralized database of the infrastructure. Other indicators may be collected from the virtualized network functions, notably by means of system logs (or "log" files in English). These other indicators comprise error codes and rates for the application implemented by the virtualized network function; they provide a detailed characterization of the application that is executed. System indicators comprise, for example, a time or percentage of use of a CPU, a memory, a disk, or the like. Such system indicators are collected by the manager of the virtual infrastructure, for example OpenStack.

In a subsequent step E7 of analysis, an analysis module of the network hypervisor conducts a comparison and analysis of the different performance indicators collected from the set of virtualized network functions $VNF_{DepA}$ on the one hand, and from the set of corresponding virtualized network functions $VNF_{DepB}$ of the virtual test network VN2 in which the security patch has been applied to the clone $VNF_{A'}$ of the virtualized network function to be updated $VNF_A$. The analysis module uses known analysis algorithms. In an exemplary embodiment, the canonical correlation analysis algorithm, better known under its English name "Canonical Correlation Analysis", or "CCA", is used. The aim of canonical correlation analysis is to compare groups of variables in pairs to determine whether they are describing the same phenomenon. Thus the algorithm is applied to the values of the indicators collected, on the one hand, from the set of virtualized network functions $VNF_{DepA}$, and, on the other hand, from the set of corresponding virtualized network functions $VNF_{DepB}$ of the virtual test network VN2, or more precisely from a virtualized network function of the set $VNF_{DepA}$ and from its clone in the virtual test network $VN_B$. The analysis is thus adapted to reveal differences in behavior, in respect of performance, between a virtualized network function of the set $VNF_{DepA}$ of the virtual production network $VN_A$ and its clone in the virtual test network $VN_B$.

In an optional alerting step E8, an alert is sent to the client when the behavior of a virtualized network function of the set of virtualized network functions $VNF_{DepA}$ differs from the behavior of its clone in the virtual test network $VN_B$ in respect of the performance measured by the performance indicators. Such an alert, representing an unsatisfactory patch, leads the client, or an entity responsible for testing the patch, to initiate a more thorough analysis in order to understand the origin of this alert and rectify it. The analysis may be manual.

The invention has been described in the case of indirect control of the virtual networks by the clients, that is to say in a case where tunnels are established and managed by the network hypervisor to route packets between different virtualized network functions hosted by different host servers. The invention is also applicable to the case where the client exercises what is called direct control over its virtual production network $VN_A$.

In the case of direct control by a client over its virtual network, the hypervisor allows the client to install rules in the network routing equipments so that the client has end-to-end control over its network. Thus the client has the impression that it is directly controlling the underlying physical network. The packets circulating for this purpose between the client's network controller and the hardware infrastructure are intercepted in a transparent manner by the network hypervisor, which modifies control packets to provide isolation between virtual networks. Thus it is common practice for the hypervisor to assign and manage a virtual network identifier belonging to the client's virtual network but not known to the client. When the client installs a rule on a network routing equipment, for example a rule for copying packets between two virtualized network functions of its virtual network, the network hypervisor usually intercepts the rule and adds an identifier of the client's virtual network before the rule is installed on the network routing equipment, so that the rule is applied solely to the packets of the client's virtual network.

In order to implement the steps of the method for applying the patch as described above in the case of direct control of the virtual network by the client, the network hypervisor must allow rules to be installed in the network routing equipments in such a way that the identifier of the virtual network of the routed packets can be changed. This is because, according to the steps of the method, a packet, in this case a duplicated packet, may move from the production network $VN_A$ to the test network $VN_B$. This change must be authorized by the network hypervisor only if the test network $VN_B$ is dedicated to testing and if the production network $VN_A$, in which the packets to be routed in the test network circulate, and the test network $VN_B$ belong to the same client. In an exemplary embodiment, the network hypervisor leaves the identifier of the virtual network in responses sent from the network routing equipments, so that the network operator is aware of this identifier and causes routing to the virtual test network to take place for the packets comprising this identifier. This is because, in the case of a conventional hypervisor, that is to say one that is not modified for the purposes of implementing the steps of the method, the hypervisor usually removes this information from the responses received from the network routing equipments for purposes of network isolation. In a variant embodiment, and in order to avoid revealing these identifiers to the client, the hypervisor translates these identifiers into pseudo-identifiers. Only the hypervisor knows the virtual network identifier to which a virtual network pseudo-identifier corresponds. This solution provides a degree of security to the hypervisor, which does not disclose these identifiers classed as sensitive.

The exemplary embodiment described above is particularly suitable for application to services based on a transport protocol that is not connection-oriented, such as the UDP (from the English "User Datagram Protocol"). With such a protocol, two entities communicate in a simple way: a packet is transmitted from a transmitter to a receiver, in a unidirectional manner, without the recipient being warned in advance of the receipt of a packet and without the recipient acknowledging receipt of the packet to the transmitter.

In the case of a connection-oriented protocol, such as the transport protocol TCP (for "Transmission Control Protocol"), a session must be established between two entities that wish to exchange data. Thus, in a connection establishment request preceding a data exchange, a first entity, called the "client", sends a synchronization packet of the "SYN" type to a second entity, called the "server". The server sends an acknowledgement in the form of a "SYN-ACK" packet. The client then sends an acknowledgement of receipt, in the form of an "ACK" packet corresponding to an acceptance message. On completion of these exchanges, the client and the server have established a session and are ready to communicate. The exchange of messages between the client and the server during the establishment of a session uses a sequence number generated from a secret value which may depend on a random hardware source. The secret value may also be derived from the exact date of arrival of the packet, in which case, if a virtualized network function of the set of dependent virtualized network functions in the operational virtual network receives a packet an instant before the corresponding virtualized network function in the virtual test network $VN_B$, then the two virtualized network functions do not have the same secret value. Thus a session established with a virtualized network function of the virtual production network $VN_A$, in the context of the execution of a service, is not established in a completely similar way with the corresponding virtualized network function in the virtual test network $VN_B$, because of this random component which may be different. In this case, the virtualized network function of the production network $VN_A$ and its clone in the test network $VN_B$ do not respond with the same sequence number when this connection is established. Consequently, the copying of a packet intended for the virtualized network function of the first network $VN_A$ and its routing to its clone in the second network do not enable the connection to the clone to be established, since the sequence number generated in the clone is inconsistent with the sequence number used by the virtualized network function in the first network $VN_A$, and therefore with the expected response.

In this example, corresponding to the use of connection-oriented communication protocols, it is necessary to introduce a virtualized network connection management function, intended to store the state of the connections between a virtualized network function in the production network $VN_A$ and its clone in the test network $VN_B$, in order to implement an effective copy of the packets. The virtualized network connection management function, denoted $VNF_{GC}$, is preferably included in the test network $VN_B$. It intercepts any packet which is addressed to a dependent virtualized network function of the production network $VN_A$, and which is duplicated by the network hypervisor and then routed to the clone of the virtualized network function in the test network $VN_B$. It also intercepts any response packet of the clone of the virtualized network function in the test network $VN_B$, in order to associate an identifier of a session being established in the production network $VN_A$ with a sequence number used in the establishment of the session in the test network $VN_B$. The virtualized network connection management function $VNF_{GC}$ is arranged for identifying the communication protocol used in the current packet exchange and for applying specific connection management if the protocol is connection-oriented. It is also arranged for allowing any other packet to pass without modification in other cases.

Figure 4:
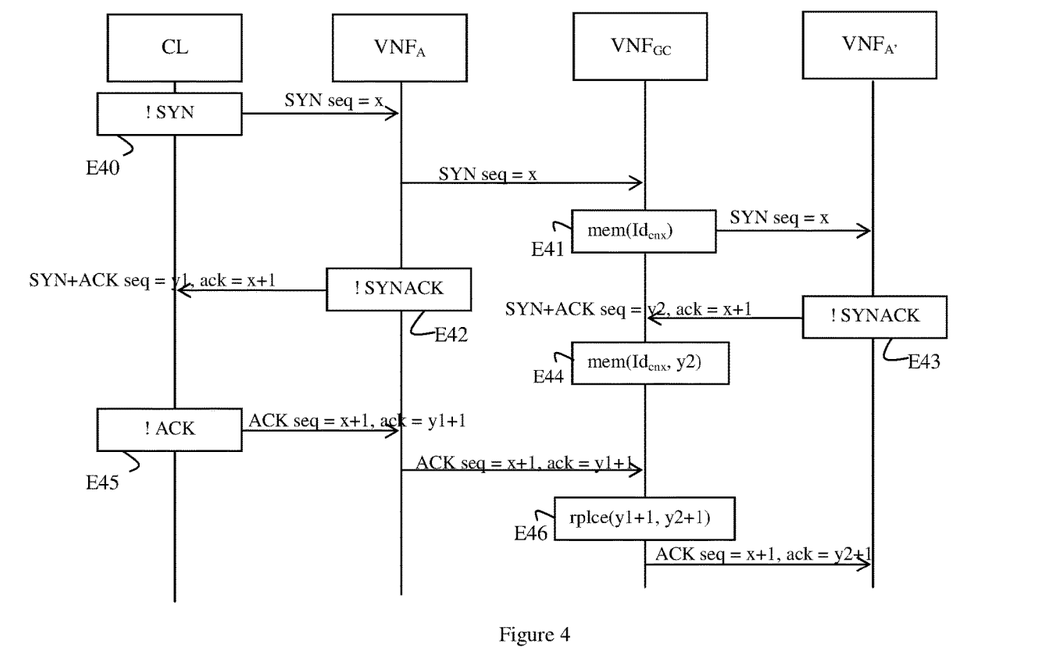
FIG. 4 shows the steps of a connection management method in the case where a connection-oriented communication protocol is used, according to an exemplary embodiment.

The steps of a method for connection management by the network connection management virtualization function, according to an exemplary embodiment, will now be described in relation to FIG. 4. When there is a connection request intended for a dependent virtualized network function of the production network $VN_A$, for example $VNF_A$, a client, for example another virtualized network function of the production network $VN_A$, sends a synchronization packet, in a step E40, in order to initiate the establishment of a connection with the virtualized network function $VNF_A$ in the production network $VN_A$. As described above in the context of the method for applying a patch, the packet is duplicated by a network routing equipment (not shown in FIG. 4) and is to be transmitted to the corresponding virtualized network function, that is to say the clone of the function $VNF_A$ in the test network $VN_B$, denoted $VNF_{A'}$. The virtualized network connection management function, $VNF_{GC}$, intercepts this message. In an analysis step E41, the virtualized network connection management function $VNF_{GC}$ identifies that the packet is a connection establishment request packet of a connection-oriented protocol, and that a particular process must be applied. For this purpose, the virtualized network connection management function, $VNF_{GC}$, analyzes the header of the packet. It stores an identifier $Id_{cnx}$ of the current TCP connection in the form of a 4-tuple comprising: a source IP address of the connection, corresponding to the client's IP address, a destination IP address of the connection, a source port and a destination port. At the end of the analysis step E41, the virtualized network connection management function $VNF_{GC}$ routes the connection establishment request packet to the clone $VNF_{A'}$ of the virtualized network function $VNF_A$ in the test network $VN_B$.

In a first response step E42, the virtualized network function $VNF_A$ responds to the connection establishment request by sending a first acknowledgement of receipt in a TCP SYN ACK packet comprising a first sequence number y1, generated from a random source.

In a second response step E43, the clone $VNF_{A'}$ of the virtualized network function sends in response a second acknowledgement of receipt in a TCP SYN ACK packet comprising a second sequence number y2 generated from a random source which may be different from the source used to generate the first sequence number y1.

In a storage step E44, the virtualized network connection management function $VNF_{GC}$ stores the second sequence number y2 in association with the connection identifier $Id_{cnx}$ obtained in step E41.

In a third response step E45, the client CL sends to the virtualized network function $VNF_A$ an acknowledgement of receipt in the form of a TCP ACK packet comprising an acknowledgement number corresponding to the first sequence number y1 incremented by 1. As described above, the packet is duplicated and is to be transmitted to the clone $VNF_{A'}$ of the virtualized network function in the test network $VN_B$. The virtualized network connection management function $VNF_{GC}$ intercepts this packet and, in a search and replace step E46, it identifies the connection $Id_{cnx}$ concerned on the basis of the 4-tuple included in the packet, and identifies the sequence number y2 stored in association with the TCP connection identifier $Id_{cnx}$ in step E44. It replaces the acknowledgement number y1+1 with a second acknowledgement number equal to the second sequence number y2 incremented by 1, that is to say y2+1. Thus the establishment of a TCP connection in the production network $VN_A$, which implies a virtualized network function of the set of dependent functions $VNF_{DepA}$, is implemented in a consistent fashion with respect to the method for applying the patch in the test network $VN_B$. For this purpose, the sequence and acknowledgement numbers are managed by the virtualized network connection management function $VNF_{GC}$, which is passed through by every packet that is duplicated and routed to a clone of a virtualized network function of the production network implicated in the method for applying the patch.

Figure 5:
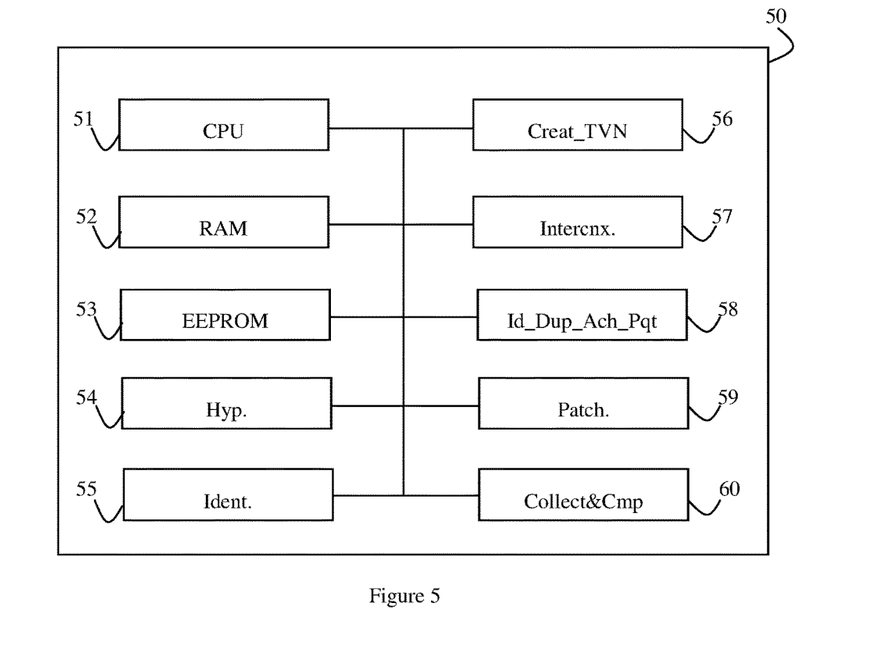
FIG. 5 is a schematic representation of a server comprising a network hypervisor arranged for implementing the steps of the method for applying a patch, according to an exemplary embodiment.

A server capable of implementing the steps of the method for applying a patch to a virtualized network function to be updated, according to an exemplary embodiment, will now be described with reference to FIG. 5.

A server 50 capable of implementing the steps of the method for applying a patch to a virtualized network function to be updated, as described above, is a computer equipment which, conventionally, comprises:

- a processing unit 51, or CPU (from the English "Central Processing Unit"), arranged for executing code instructions,
- a set of memories, including a volatile memory 52 of the RAM type (from the English "Random Access Memory"), used for executing code instructions, storing variables, etc., and a storage memory 53 of the flash memory or "EEPROM" (from the English "Electrically-Erasable Programmable Read Only Memory") type. The storage memory 53 is arranged for storing data and applications. In particular, the storage memory 53 stores a software module for applying a patch to a faulty virtualized network function of a first virtual network $VN_A$ (the first virtual network is not shown in FIG. 5), the module being arranged for implementing the steps of the method for applying a patch to a virtualized network function to be updated as described above, these steps being implemented by the network hypervisor hosted by server 50.

The server 50 is arranged for hosting a network hypervisor 54 adapted to be interfaced between a first virtual network $VN_A$ and a set of at least one hardware resource capable of supplying necessary resources to said first virtual network. Said network hypervisor 50 is a software module comprising the following modules, hosted by the server 50:

- an identification module 55, arranged for identifying a set of dependent virtualized network functions included in the first virtual network, said set comprising at least the virtualized network function to be updated. The identification module 55 is arranged for implementing step E1 of the method for applying a patch to a virtualized network function to be updated, as described above;
- a creation module 56, arranged for creating a second virtual network $VN_B$, called a "virtual test network", said virtual test network comprising clones of virtual machines implementing the dependent virtualized network functions of the set, said cloned virtual machines forming clones of the dependent virtualized network functions of the set. The creation module 56 is arranged for implementing step E2 of the method for applying a patch to a virtualized network function to be updated, as described above;
- an interconnection module 57, arranged for interconnecting, in the virtual test network, clones of the dependent virtualized network functions of the set, the interconnection of the clones of the dependent virtualized network functions of the set being identical to an interconnection in the first network of the dependent virtualized network functions of the set. The interconnection module 57 is arranged for implementing step E3 of the method for applying a patch to a virtualized network function to be updated, as described above;
- an identification, duplication and routing module 58, arranged for identifying at least one input data packet of a virtualized network function of the set of dependent virtualized network functions, for duplicating said packet, and for routing said duplicated packet to the virtual test network. It should be noted that the packet is sent from a virtualized network function which does not form part of the set of dependent virtualized network functions; it is a packet that arrives at the input of the elements comprising the dependent virtualized network functions forming the sub-network to be tested. The identification, duplication and routing module 58 is arranged for implementing step E4 of the method for applying a patch to a virtualized network function to be updated, as described above;
- an application module 59, arranged for applying a patch to the clone of the virtualized network function to be updated in the test network. The application module 59 is arranged for implementing step E5 of the method for applying a patch to a virtualized network function to be updated, as described above;

a collection and comparison module 60, arranged for collecting and comparing values of at least a first and a second performance indicator, a first indicator measuring a performance value on a monitored virtualized network function of the set of dependent virtualized network functions of the first virtual network and a second indicator measuring the performance value on the clone of the monitored virtualized network function in the virtual test network, an alert being triggered when the values of the first and second indicators differ. The collection and comparison module 60 is arranged for implementing steps E6 and E7 and the optional step E8 of the method for applying a patch to a virtualized network function to be updated, as described above.

The network hypervisor 54, the identification module 55, the creation module 56, the interconnection module 57, the identification, duplication and routing module 58, the application module 59 and the collection and comparison module 60 are preferably software modules comprising software instructions for implementing the steps of the method for applying a patch to a virtualized network function to be updated, as described above, these steps being executed by the network hypervisor 54 hosted by the server 50.

The invention therefore also concerns:
- a computer program comprising instructions for executing the method for applying a patch to a virtualized network function to be updated as described above, when this program is executed by a processor of the server, and
- a readable recording medium on which the computer program described above is recorded.

An exemplary embodiment of the present application overcomes deficiencies/drawbacks of the prior art and/or makes improvements thereto.

Although the present disclosure has been described with reference to one or more examples, workers skilled in the art will recognize that changes may be made in form and detail without departing from the scope of the disclosure and/or the appended claims.

The invention claimed is:

1. A method for applying a patch to a virtualized network function to be updated that is included in a first virtual network, a network hypervisor being interfaced between the first virtual network and a set of at least one hardware resource capable of supplying necessary resources to said first virtual network, said method, implemented by the network hypervisor in a device, comprising:
   identifying a set of dependent virtualized network functions included in the first virtual network, said set of dependent virtualized network functions comprising at least the virtualized network function to be updated,
   creating a second virtual network called a "virtual test network", said virtual test network comprising clones of virtual machines implementing the dependent virtualized network functions of the set, said cloned virtual machines forming clones of the dependent virtualized network functions of the set,
   interconnecting, in the virtual test network, clones of the dependent virtualized network functions of the set, said interconnection being identical to an interconnection in the first virtual network of the dependent virtualized network functions of the set,
   identifying at least one input data packet of a virtualized network function of the set of dependent virtualized network functions, duplicating said packet and routing said duplicated packet to the virtual test network,
   applying the patch to the clone of the virtualized network function to be updated in the virtual test network, and
   collecting and comparing values of at least a first and a second performance indicator, a first indicator measuring a performance value on a monitored virtualized network function of the set of dependent virtualized network functions of the first virtual network and a second indicator measuring the performance value on the clone of the monitored virtualized network function in the virtual test network, an alert being triggered when the values of the first and second indicators differ.

2. The method as claimed in claim 1, wherein the set of dependent virtualized network functions also comprises at least another virtualized network function which is functionally dependent on the virtualized network function to be updated.

3. The method as claimed in claim 1, wherein, when a virtual infrastructure manager makes an interface of the network hypervisor available to a client to which the first virtual network has been allocated, so that the client controls the first virtual network, said client thus exercising what is called indirect control over the first virtual network, the identification of the input packet of a virtualized network function of the set of dependent virtualized network functions, the duplication of the packet and the routing of said duplicated packet to the virtual test network comprise, when the virtualized network function of the set of dependent virtualized network functions and the clone of the corresponding virtualized network function included in the second virtual network are hosted by a same host server:
   installing a configuration rule on a network routing equipment of the host server, said network routing equipment being adapted to transmit the packet to the virtualized network function of the set of dependent virtualized network functions, said configuration rule comprising duplication of the input packet of the virtualized network function of the set of dependent virtualized network functions, and transmission of said duplicated packet to the clone of the corresponding virtualized network function contained in the second virtual network and hosted by the host server.

4. The method as claimed in claim 1, wherein, when a virtual infrastructure manager makes an interface of the network hypervisor available to a client to which the first virtual network has been allocated, so that the client controls the first virtual network, said client thus exercising what is called indirect control of the first virtual network, the identification of the input packet of a virtualized network function of the set of dependent virtualized network functions, the duplication of the packet and the routing of said duplicated packet to the corresponding virtualized network function in the virtual test network comprise, when the virtualized network function of the set of dependent virtualized network functions is hosted by a first host server and the clone of the corresponding virtualized network function contained in the second virtual network is hosted by a second host server:
   installing a first configuration rule on a first network routing equipment of the first host server, said first network routing equipment being adapted to transmit the packet to the virtualized network function of the set of dependent virtualized network functions, said configuration rule comprising duplication of the input packet of the virtualized network function of the set of dependent virtualized network functions, and transmission of said duplicated packet to the second host server, a second configuration rule being installed on a second virtual network routing equipment included in the second host server, the second configuration rule comprising the transmission of said packet to the clone of the corresponding virtualized network function included in the second virtual network and hosted by the second host server.

5. The method as claimed in claim 1, wherein the network hypervisor receives from an operator of the first virtual network a rule to be installed in a network routing equipment, said rule modifying an identifier of the first virtual network, included in the duplicated packet to be routed to the virtual test network, into an identifier of the virtual test network, said rule being installed on the equipment by the network hypervisor when the virtual test network is dedicated to the tests of virtualized network functions and when the first virtual network and the virtual test network belong to the same client.

6. The method as claimed in claim 1, wherein, a connection-oriented communication protocol being used to communicate with a dependent virtualized network function of the set, the acts of identifying, duplicating and routing the packet to the virtual test network comprises, in a connection establishment phase:
receiving a synchronization packet, said synchronization packet having been received by the dependent virtualized network function and duplicated and being intended for routing to the corresponding virtualized network function in the virtual test network, said synchronization packet comprising a connection identifier, and routing said synchronization packet to the corresponding virtualized network function in the virtual test network,
receiving from the corresponding virtualized network function a first acknowledgement packet comprising a first sequence number, and associating the first sequence number included in said acknowledgement packet with the connection identifier, and routing said first acknowledgement packet,
receiving a second acknowledgement packet, said second acknowledgement packet having been received previously by the dependent virtualized network function and duplicated and being intended for routing to the corresponding virtualized network function in the virtual test network, said second acknowledgement packet comprising the connection identifier and a first acknowledgement number calculated by incrementing a second sequence number generated and transmitted previously by the dependent virtualized network function, and replacing, in the second acknowledgement packet, said first acknowledgement number with a second acknowledgement number calculated by incrementing the first sequence number, and routing said second acknowledgement packet to the corresponding virtualized network function in the virtual test network.

7. A server comprising:
a processor; and
a non-transitory computer readable medium comprising instructions stored thereon which when executed by the processor configure the server to:
implement a network hypervisor interfaced between a first virtual network and a set of at least one hardware resource capable of providing necessary resources for said first virtual network, said network hypervisor being adapted to apply a patch to a virtualized network function to be updated included in the first virtual network;
identify a set of dependent virtualized network functions included in the first virtual network, said set comprising at least the virtualized network function to be updated;
create a second virtual network called a virtual test network, said virtual test network comprising clones of virtual machines implementing the dependent virtualized network functions of the set, said cloned virtual machines forming clones of the dependent virtualized network functions of the set;
interconnect, in the virtual test network, clones of the dependent virtualized network functions of the set, the interconnection of the clones of the dependent virtualized network functions of the set being identical to an interconnection in the first virtual network of the dependent virtualized network functions of the set;
identify at least one input data packet of a virtualized network function of the set of dependent virtualized network functions, duplicate said packet, and route said duplicated packet to the virtual test network;
apply the patch to the clone of the virtualized network function in the virtual test network; and
collect and compare values of at least a first and a second performance indicator, a first indicator measuring a performance value on a monitored virtualized network function of the set of dependent virtualized network functions of the first virtual network and a second indicator measuring the performance value on the clone of the monitored virtualized network function in the virtual test network, an alert being triggered when the values of the first and second indicators differ.

8. A non-transitory computer-readable medium comprising a computer program stored thereon the program comprising program code instructions for controlling execution of a method for applying a patch to a virtualized network function to be updated in a first virtual network, when the program is executed on a computer server, a network hypervisor being interfaced between the first virtual network and a set of at least one hardware resource capable of supplying necessary resources to said first virtual network, wherein the instructions configure the computer server to:
identify a set of dependent virtualized network functions included in the first virtual network, said set comprising at least the virtualized network function to be updated,
create a second virtual network called a "virtual test network", said virtual test network comprising clones of virtual machines implementing the dependent virtualized network functions of the set, said cloned virtual machines forming clones of the dependent virtualized network functions of the set,
interconnect, in the virtual test network, clones of the dependent virtualized network functions of the set, said interconnection being identical to an interconnection in the first virtual network of the dependent virtualized network functions of the set,
identify at least one input data packet of a virtualized network function of the set of dependent virtualized network functions, duplicate said packet and route said duplicated packet to the virtual test network,
apply the patch to the clone of the virtualized network function to be updated in the virtual test network, and
collect and compare values of at least a first and a second performance indicator, a first indicator measuring a performance value on a monitored virtualized network function of the set of dependent virtualized network functions of the first virtual network and a second indicator measuring the performance value on the clone of the monitored virtualized network function in the virtual test network, an alert being triggered when the values of the first and second indicators differ.

* * * * *